Figure 1:
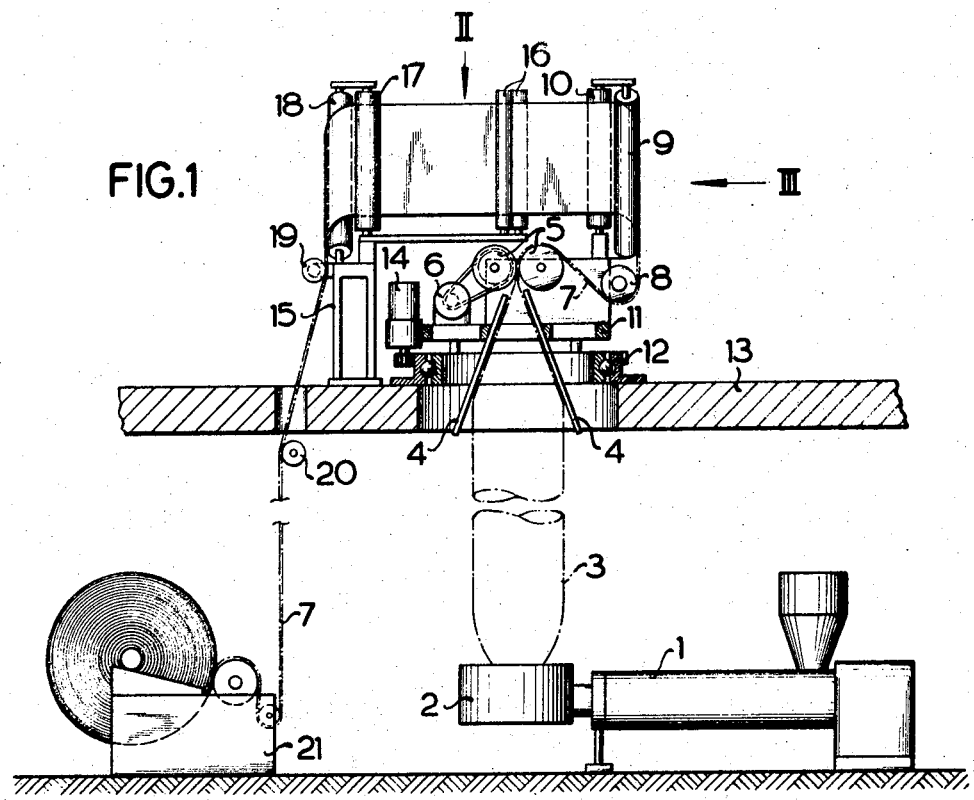

United States Patent

[11] 3,632,265

[72] Inventor Hartmut Upmeier
 Tecklenburg, Germany
[21] Appl. No. 923
[22] Filed Jan. 6, 1970
[45] Patented Jan. 4, 1972
[73] Assignee Windmoller & Holscher
 Lengerichof Westphalia, Germany
[32] Priority Jan. 7, 1969
[33] Germany
[31] P 19 00 614.5

[54] FLATTENING AND TAKE-AWAY DEVICE FOR BLOWN TUBING OF PLASTICS MATERIAL
5 Claims, 4 Drawing Figs.

[52] U.S. Cl....................................................... 425/326,
 425/455
[51] Int. Cl....................................................... B29d 7/00
[50] Field of Search........................................... 18/14 A, 14
 RR, 12 TB, 12 DR

[56] References Cited
UNITED STATES PATENTS

| 2,501,584 | 3/1950 | Schanz | 18/14 A UX |
| 3,388,426 | 6/1968 | Schott | 18/14 A UX |

*Primary Examiner*—H. A. Kilby, Jr.
*Attorney*—Fleit, Gipple & Jacobson

ABSTRACT: The flattening and take-away device is combined with a stationary blow head and comprises flattening plates and deflecting rolls, to which an oscillating angular movement is imparted about an axis of rotation which coincides with the axis of the tubing which emerges from the blow head. The take-away rolls are succeeded by a deflecting rod, which is inclined at an angle of 45° from the axis of rotation and revolves about the same. The deflecting rod is succeeded by at least one deflecting roll, which is parallel to the axis of rotation and also revolves about the same. The tubing is further moved from said deflecting roll over at least one additional deflecting roll, which is also parallel to the axis of rotation but in a stationary position.

PATENTED JAN 4 1972

3,632,265

INVENTOR
Hartmut UPMEIER
By
Fleit, Gipple & Jacobson
his ATTORNEYS

FLATTENING AND TAKE-AWAY DEVICE FOR BLOWN TUBING OF PLASTICS MATERIAL

It is known that thickness tolerances are inevitable in the manufacture of sheeting from synthetic thermoplastics. When such sheeting having thickness variations is wound up, the thicker portions of the sheeting accumulate on the roll so that annular beads are formed, which result in a permanent deformation of the sheeting in this area. When such sheeting has been unwound, it is no longer perfectly planar so that the printing and processing to form packaging means or similar products are rendered more difficult.

In the manufacture of blown tubing or of flat sheeting formed by longitudinally slitting a tubing, the formation of annular beads on the rolls and the resulting disadvantages can be eliminated if a relative rotation is produced between the blow head through which the tubing is extruded, on the one hand, and the flattening and take-away device, on the other hand. This rotation may consist of a continuous rotation or of angular movements in opposite directions with a reversal taking place after an angular movement of about 360°. Such rotation results in a distribution of thickness tolerances of the tubing or sheeting throughout the width of the roll so that cylindrical rolls are formed which are free of annular beads. This effect is similar to that obtained by winding a cable on a drum.

Various measures have been disclosed which results in a relative motion between the blow head for extruding tubing and the take-away device. In a first embodiment, the blow head is connected by a suitable torque-transmitting device to the screw extruder. In this case, the leadout of the torque-transmitter device must be provided with a seal which resists the high pressures (about 200–300 kilograms per square centimeter) which are exerted by the composition, which is at a high temperature. A replacement of these seals is often required and involves a loss in output. The rotation of the blow head results in a distribution only of the thickness variations which are caused by the blow head itself rather than of the variations which are due to the flow of the composition in the parts leading to the blow head. These parts comprise in most cases a bend. Even where the blow head is rotated, such flow-induced variations are always exhibited at one and the same point of the tubing emerging from the blow head so that rolls of tubing or sheeting made in such plants often have annular beads. Besides, the supply of electric power to the blow head by means of sliprings or trailing cables is liable to be deranged because high environmental temperatures prevail in these areas.

A distribution of all flow-induced tolerances occurring either in the blow head or in the supply ducts cannot be accomplished unless the entire screw extruder with the blow head secured to it and the cooling ring are rotated or the take-away and flattening device is rotated. It has been disclosed to provide a turntable which carries the screw extruder having a vertical barrel and having the blow head secured thereto, the arrangement being such that the exit of the barrel, blow head and tubing coincides with the axis of rotation of the turntable. The latter carries the drive motor, the cabinet for an automatic temperature control, and the cooling ring for discharging cooling air onto the tubing. The screw extruder performs an oscillating angular movement, which is reversed whenever an angular movement of about 360° has been performed. Power is supplied to the screw extruder by trailing cables or trailing tubes. In a modified embodiment based on the same principle, a stationary screw extruder is provided with a feed barrel adapted to perform an oscillating angular movement, and a blow head secured to said barrel. This feed barrel may be arranged with its axis extending in a vertical or horizontal direction.

All these screw extruders have the disadvantage that they are special units which can be used only to make blown tubing whereas their use for other manufacturing purposes, e.g., for the manufacture of flat sheeting with the aid of a slot die, is impossible or uneconomical. For practical reasons, e.g., where the extruder is arranged with a vertically extending cylinder axis, only screw extruders having a small or medium overall size and a correspondingly restricted output can be used.

It is also known to provide a rotatably mounted take-away and flattening device whereas the screw extruder is stationary. In this case, the tubing must be wound up directly at the take-away device by a corotating winding device, which must be stopped when the roll is to be replaced. The tubing must be wound up first and cannot be supplied directly to a machine for its further processing, e.g., a printing machine, and be wound up thereafter. Another disadvantage resides in that the rolls of tubing, which often have a heavy weight, must be lowered by a hoist from the intermediate platform carrying the hoist to the floor of the workshop for further processing.

It is an object of the invention to provide a flattening and take-away device for blowing tubing of plastics material, which device is adapted to be used with stationary blow heads and which avoids the disadvantages of the known devices in that any flow-induced variations which are caused in the blow head and in the supply ducts are uniformly distributed, the universal usefulness of the screw extruder is not adversely affected, and which device does not involve an uneconomical space requirement, nor problems relating to the supply of power, and permits the tubing to be selectively supplied directly to a processing machine or to a stationary winding device.

This object is accomplished according to the invention in that the take-away rolls are succeeded by a deflecting rod, which is inclined at an angle of 45° from the axis of rotation and revolves about the same, the deflecting rod is succeeded by at least one deflecting roll, which is parallel to the axis of rotation and also revolves about the same, and the tubing is further moved from said deflecting roll over at least one additional deflecting roll, which is also parallel to the axis of rotation but in a stationary position. Hence, the flattened tubing is deflected by the deflecting rolls and the deflecting rod to move at right angles to the direction in which it is taken away and is supplied from the side to the stationary deflecting roll, preferably to a pair of stationary deflecting rolls, from which the tubing can be supplied to a stationary winding device or a machine for further processing.

In a particularly desirable embodiment, the deflecting rod, a deflecting roll which precedes the deflecting rod and is parallel to the deflecting rod, and the deflecting roll which succeeds the deflecting rod and is parallel to the axis of rotation are eccentric to the axis of rotation and the nip of the stationary pair of deflecting rolls lies approximately on the axis of rotation. This arrangement will ensure that the deflecting rod and the succeeding deflecting roll which is parallel to the axis of rotation will be maintained at a constant distance from the axis of rotation during the oscillating angular movement of the device so that a constant take-away speed will also be maintained.

The use of the flattening and take-away device according to the invention permits of a connection of normal screw extruders—including those of large size having high output rates—to normal blow heads for tubing reliably and without need for rotary joints, which are liable to be deranged. When combined with vertical screw extruders, the rotatable take-away and flattening device may be mounted on a lightweight intermediate platform because it is not necessary to wind up the tubing on corotating windup rolls, which must subsequently be lowered onto the floor of the workshop. Besides, the tubing can be supplied directly to a processing machine without need for winding up the tubing before. Whereas a stationary tubing blow head and a stationary cooling ring for discharging cooling air onto the tubing are employed, the use of the device according to the invention ensures that all thickness variations of the tubing which are due to the screw extruder, the parts connected to the blow head, the blow head itself, and the means for cooling the blow head, are uniformly distributed, throughout the roll of tubing so that even tubing having very poor tolerances will form absolutely cylindrical rolls, such as are important for a proper further processing of the tubing. It is emphasized that only a few deflecting rolls and deflecting rods are sufficient for accomplishing the object in accordance with the invention and these deflecting rolls and deflecting rods perform an oscillating rotational movement in unison with the take-away rolls. The reversal of the direction of rotation after an angular movement of about 360° or less ensures an unobstructed withdrawal of the tubing from the stationary central deflecting rolls to the winding device or the machine for further processing. The expenditure involved in the flattening and take-away device according to the invention is much lower than that involved, e.g., in an easily disturbed rotary joint for a blow head or in a corotating winding device provided with means for removing the finished rolls and involving losses in output due to the need for a replacement of rolls.

In a desirable development of the invention, the deflecting rod is nonrotatably secured to the take-away device and has a low-friction surface because a rotation of the deflecting rod would exert on the tubing an additional displacing force in the longitudinal direction of the deflecting rod. When the blown tubing emerges from the blow head in a vertical direction and the take-away device is mounted on an intermediate platform, it will be desirable to provide an additional stationary deflecting rod, which succeeds the central pair of stationary rolls in the direction of travel of the tubing and extends at an angle of 45° to the axis of the tubing, and stationary deflecting rolls proceeding and succeeding the last-mentioned deflecting rod. With this arrangement, the winding device or the machine for further processing may be mounted on the floor of the workshop close to the screw extruder.

Figure 2:
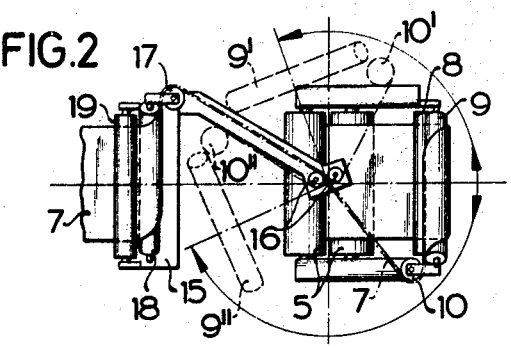
Figure 3:
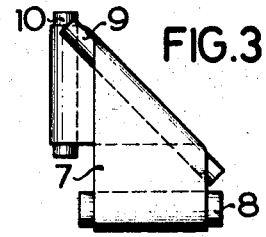
Figure 4:
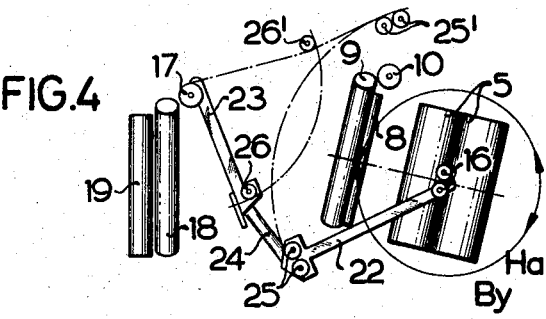

The invention will now be explained more in detail hereinafter with reference to the drawing, which shows illustrative embodiments. In the drawing FIG. 1 is a screw extruder which is intended to make blown tubing and provided with the device according to the invention for flattening and taking away the blown tubing, FIG. 2 shows the device of FIG. 1 in a top plan view taken in the direction of the arrow II in FIG. 1, FIG. 3 shows the device according to the invention in a side elevation taken in the direction of the arrow III of FIG. 1 and FIG. 4 shows another illustrative embodiment of that part of the device in which the sheeting is turned back.

As is illustrated in FIG. 1, a tubing 3 is made by a diagrammatically shown screw extruder 1 and a blow head 2 for tubing, and is flattened by flattening plates 4 and taken away by a pair of take-away rolls 5, which are driven in known manner by a gearmotor 6. A deflecting roll 8 is provided, which is laterally disposed, extends parallel to the take-away rolls 5 and revolves in unison with the take-away rolls 5. The deflecting roll 8 deflects the flattened tubing into a direction which is parallel to the axis of rotation. A nonrotating deflecting rod 9 extends at an angle of 45° to the axis of the tubing and deflects the tubing laterally through 90°. Thereafter, the tubing moves around a deflecting roll 10 in a vertical orientation through the axis of rotation of the take-away device, where a pair of deflecting rolls 16 are provided, which are rotatably mounted on axles mounted on a stationary stand 15.

The take-away and deflecting rolls are secured to a rotatably mounted frame 11, which is mounted on an intermediate platform 13 of the workshop, e.g., by means of a ball bearing assembly 12. Angular oscillation is imparted to the stand by a gearmotor 14. Driving power and, if desired, compressed air, may be supplied in known manner by trailing cables and trailing hoses or by sliprings and rotary joints. For the sake of clearness, these means as well as the means for reversing the angular movement, are not shown. The angular movement may be reversed in known manner by limit switches.

The flattened tubing moves in a vertical orientation through the nip between the stationary central deflecting rolls 16. This nip coincides with the axis of rotation of the take-away device. From the rolls 16, the flattened tubing moves around a deflecting roll 17, which is parallel to the deflecting rolls 16, another deflecting rod 18, which is inclined through 45°, and a deflecting roll 19, which are all secured also to the stand 15. As a result, the tubing is deflected once more through 90° and in a direction which is opposite to its original direction of travel is supplied over one or more guide rollers 20 to a winding device 21, which in the embodiment shown by way of example consists of a winding device driven at its periphery.

For the sake of clearness, the rotary mounting 12 and the gearmotor 6 and 14 are omitted in FIG. 2. The two end positions assumed by the deflecting rod 9 and the roll 10 during their pivotal movement are indicated in dotted lines at 9', 10' and 9'', 10''. The central position is shown in solid lines. Dash-dot lines indicate the course of the tubing in the central and end positions. The deflecting of the tubing by the nonrotating deflecting rod 9, which extends at an angle of 45° to the axis of the tubing, is particularly apparent from FIG. 3.

In the embodiment shown by way of example in FIGS. 1 and 3, the range of the pivotal movement of the take-away device is limited to about 270°–300°, depending on the width of the tubing and the distance of parts 15, 17, 18, 19 from the axis of rotation. Experience has shown that this range is fully sufficient for a distribution of thickness variations in the tubing on the roll of tubing. When the thickness variations of the tubing are very large and particularly when they are disposed on one side, the range of the angular movement of the take-away device must be increased to 360° to ensure an absolutely correct distribution of the variations. This movement can be obtained without a substantial extra expenditure if, in accordance with an additional feature of the invention, the central stationary deflecting rolls 16 are succeeded by deflecting rolls which function like dancer rolls to deflect the tubing laterally before the take-away device reaches one or the other of its dead centers. An embodiment of such a back-turning device is shown in FIG. 4. For the sake of clearness, only the rolls and deflecting rods of the take-away device and the stationary deflecting frame 15 are shown. Laterally pivotally movable levers 22 and 23 are disposed between the pair of deflecting rolls 16 and the deflecting roll 17 and are movably connected by a connecting member 24. A pair of deflecting rolls 25 and a deflecting roll 26 are secured to the levers 22 and 23. FIG. 4 shows the take-away device in the position in which its direction of rotation is reversed. To avoid a change of the length of tubing disposed between the stationary rolls 16 and 17 during the pivotal movement of the levers, the deflecting rolls are set back from the pivots of the levers approximately by the radius of each roll. A stop is suitably provided in the joint between the levers 22 and 23 to prevent an opening of that joint beyond the angle which is shown in the drawing.

What is claimed is:

1. In an apparatus for making blown tubing of plastics material by means of a stationary blow head and a flattening and take-away device which comprises flattening plates and deflecting rolls, to which an oscillating angular movement is imparted about an axis of rotation which coincides with the axis of the tubing which emerges from the blow head, the improvement resides in that take-away rolls are succeeded by a deflecting rod, which is inclined at an angle of 45° from the axis of rotation and revolves about the same, the deflecting rod is succeeded by at least one deflecting roll, which is parallel to the axis of rotation and also revolves about the same, and the tubing is further moved from said deflecting roll over at least one additional deflecting roll, which is also parallel to the axis of rotation but in a stationary position.

2. An apparatus according to claim 1, in which the take-away rolls are succeeded by two deflecting rolls, which are mounted on stationary axes and disposed one beside the other and define a nip extending in the direction of the axis of rotation of the take-away device, and the flattened tubing is supplied to the last-mentioned deflecting rolls from the take-away rolls by a deflecting rod, which revolves in unison with the take-away rolls about the axis of rotation of the take-away device and is laterally inclined from the axis of rotation and at an angle of 45° from the axis of the tubing, and by deflecting rolls which respectively precede and succeed said deflecting rod, the first of said last-mentioned deflecting rolls being parallel to the take-away rolls and the second of said last-mentioned deflecting rolls being parallel to the stationary central deflecting rolls.

3. An apparatus according to claim 1, characterized in that the deflecting rod is nonrotatably secured to the take-away device and has a low-friction surface.

4. An apparatus according to claim 1, characterized in that the central pair of stationary deflecting rolls is succeeded in the direction of travel of the tubing by an additional deflecting rod extending at an angle of 45° to the axis of the tubing and preceded and succeeded by stationary deflecting rolls.

5. An apparatus according to claim 3, characterized in that the take-away device performs angular movements of 360° and the stationary central deflecting rolls and the deflecting roll which precedes the deflecting rod are succeeded by deflecting rolls, which laterally deflect the tubing before the take-away device reaches its dead centers.

* * * * *